Dec. 9, 1941.    R. H. ROSENBERG    2,265,578
BRAKE ACTUATING MECHANISM
Filed June 28, 1940    2 Sheets-Sheet 1
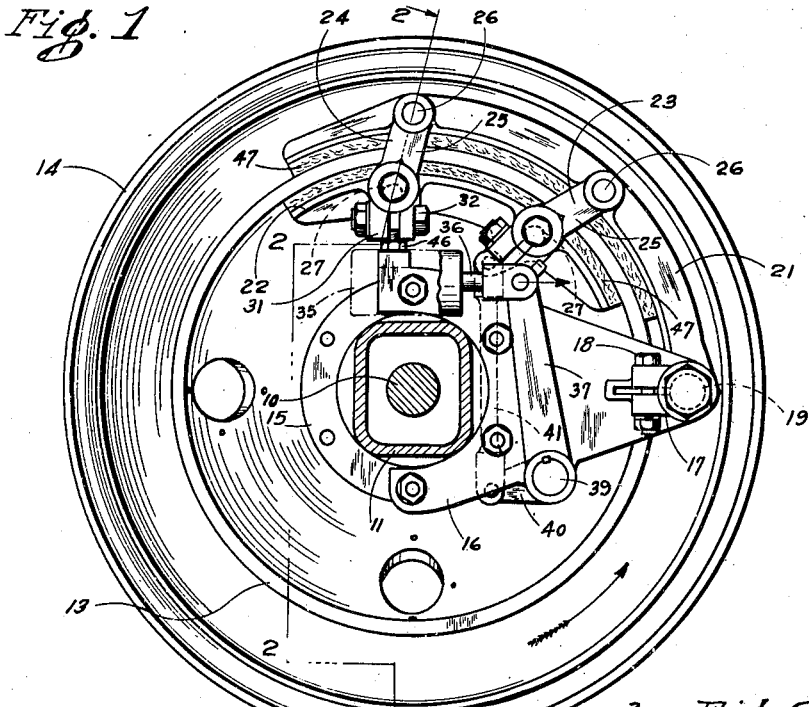
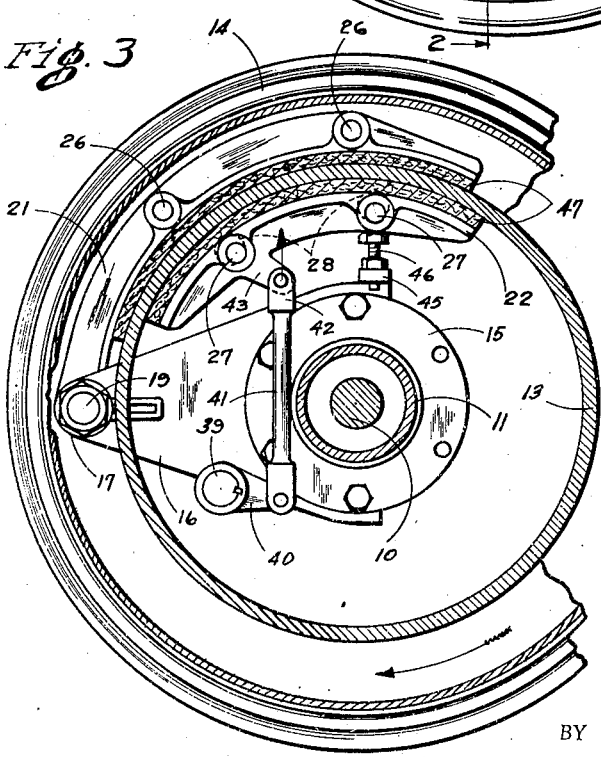
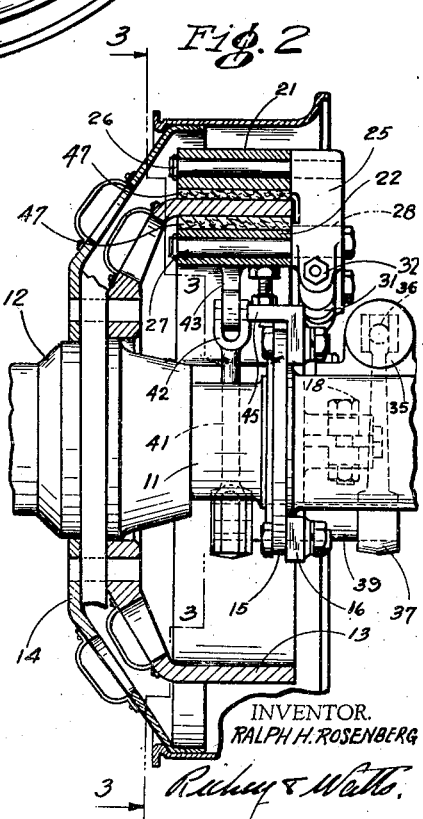
INVENTOR.
RALPH H. ROSENBERG
BY
ATTORNEYS.

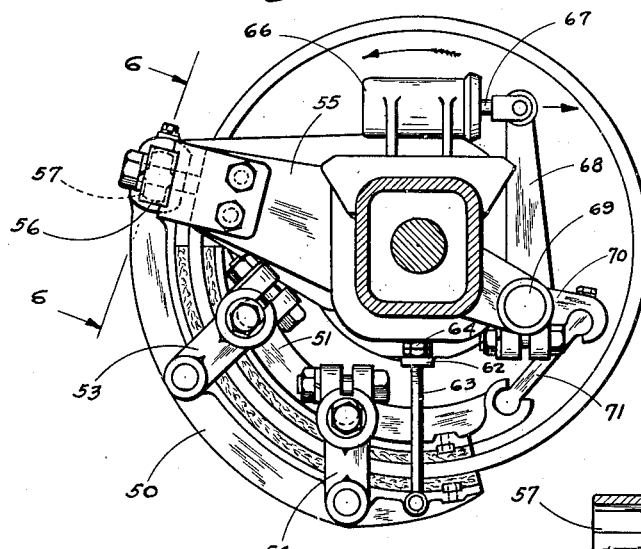
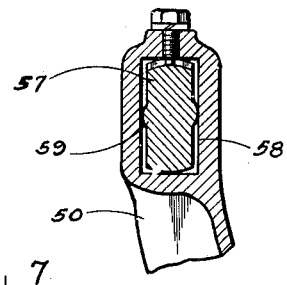
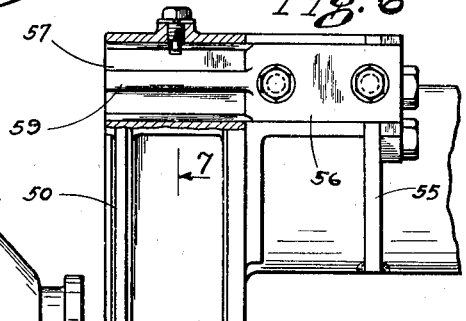
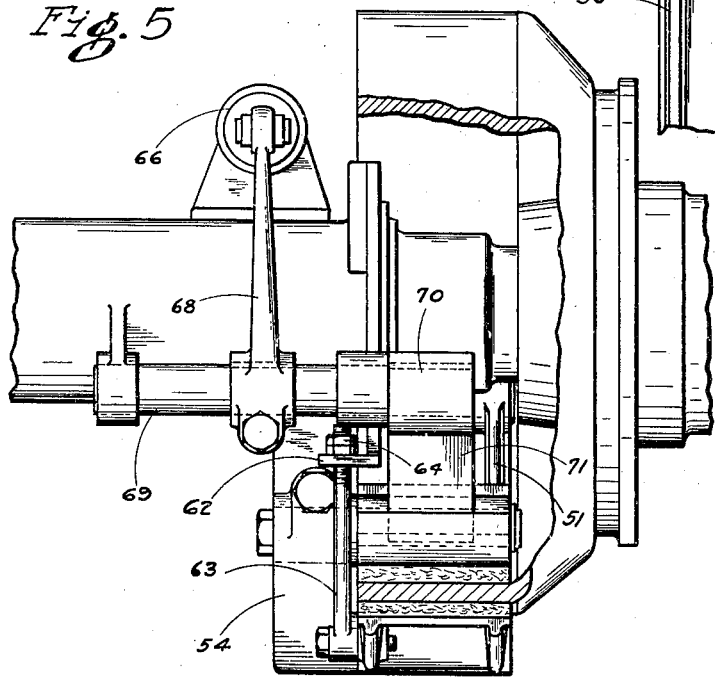

Patented Dec. 9, 1941

2,265,578

UNITED STATES PATENT OFFICE 2,265,578

BRAKE ACTUATING MECHANISM

Ralph H. Rosenberg, Detroit, Mich., assignor to Detroit Duo-Grip Brake Company, Detroit, Mich., a corporation of Michigan Application June 28, 1940, Serial No. 342,987

2 Claims. (Cl. 188—76)

This invention relates broadly to brakes for motor vehicles and more specifically to improvements in mechanism for neutralizing the torque reactions therein.

In my prior Patents No. 2,143,998, issued January 17, 1939 and No. 2,192,696, issued March 5, 1940, I have disclosed a vehicular brake which embodies generally an internal and external brake shoe organized for simultaneous application through a fork mounted to straddle the flange of the brake drum and oscillate about an axis parallel thereto.

My present invention comprehends a brake assembly which constitutes an improvement of the forms previously disclosed through the provision of a combination of levers arranged to permit the prerequisite independent movement of certain parts of the assembly in relation to others and the provision of linkage which will multiply the effort of application upon the braking surface of the drum.

More particularly my invention is designed with the object of utilizing the principles previously set forth in the brake actuating mechanism with a hydraulic actuating unit and to arrange the connections with the brake shoes in such a manner as to relieve the unit from the torque effect normally imposed thereon.

Other objects and advantages reside in the specific construction and aggroupment of elements peculiar to my structure as will become apparent from the following description and accompanying drawings, which disclosure, it is believed, will suffice to impart a clear understanding of the invention as identified by the claims appended hereto.

In the drawings:

Fig. 1 is a transverse sectional view through the rear axle of a motor vehicle illustrating in elevation the brake shoes and operating mechanism therefor;

Fig. 2 is a vertical section through the brake mechanism illustrated in Fig. 1, the section being taken on a plane indicated by line 2—2 of Fig. 1;

Fig. 3 is a transverse sectional view of the brake mechanism illustrated in Fig. 1, the section being taken on a plane indicated by the line 3—3 of Fig. 2;

Fig. 4 is an elevational view of a modified form of the invention;

Fig. 5 is a rear elevational view of the brake shoes and actuating mechanism shown in Fig. 4, a portion of the brake drum being broken away and shown in section;

Fig. 6 is a sectional view of the supporting structure for one end of the external brake shoe, the section being taken on a plane indicated by line 6—6 in Fig. 4; and Fig. 7 is a transverse sectional view of an end portion of the external brake shoe and the supporting arm therefor, the section being taken on a plane indicated by line 7—7 of Fig. 6.

Referring to the drawings, the improved brake structure is shown as coordinated with a vehicular axle comprising, a drive shaft 10 extending through a housing 11 and having keyed to an end thereof a hub 12 for the support of a brake drum 13 and wheel 14 of the conventional form. Formed on the axle housing 11 there is an annular flange 15 having an arm 16 mounted thereon which is constructed with a boss 17 in the free end thereof. The arm 16 adjacent the boss 17 is formed with a lug which is split and cross drilled to receive a bolt 18 to facilitate the adjustable securement of a pin 19.

The external brake shoe 21, as provided herein, is fulcrumed on the pin 19 and connected with the internal brake shoe 22 by means of links or forks 23 and 24. As shown in Figs. 1 and 2, the forks are preferably constructed with arms 25 having pintles 26 and 27 pressed therein or may be formed as integral structures. The pintles 26 are pivotally connected to the external shoe 21, the internal brake shoe 22 being pivotally mounted on the pintles 27 which are provided with eccentric head portions 28 to facilitate the adjustment of the brake shoes toward and away from each other. Formed in an end of the forks 23 and 24 there are split bosses 31 which are adapted to have the eccentric head portions of the pintles adjustably clamped therein by the bolts and nuts 32.

Secured to the axle housing 10 there is a suitable fluid actuating mechanism such as a cylinder 35 having a reciprocating piston therein with a piston rod 36 projecting therefrom. Pivotally mounted on the end of the piston rod there is a lever 37 having the opposed end thereof keyed to a shaft 39. Affixed to the shaft 39 there is an arm 40 which has pivotally mounted thereon by means of a pin, the bifurcated end of a rod 41, having the opposed end thereof provided with a yoke 42 adapted for pivotal engagement with an abutment 43 projecting from the internal brake shoe 22. The cylinder 35 is connected to a brake operating mechanism, not shown, in the manner customarily employed in brake constructions embodying a fluid actuating mechanism.

Formed on the inner end of the arm 16 there is a lip or flange 45 which is drilled and tapped for the reception of a jack screw 46 adapted to engage the internal brake shoe for limiting the inward radial movement thereof. Brake lining 47 is secured to the adjacent faces of the external and internal brake shoes.

In the operation of the brake the piston rod 36 and lever 37 are moved in the direction of the arrow shown in Fig. 1 through the actuation of the brake mechanism connected to the cylinder 35. Upon the movement of the lever 37 the shaft 39 and arm 40 will be oscillated, thereby actuating the rod 41 and thus moving the external and internal brake shoes into engagement with the brake drum 13. The movement of the internal shoe 22 towards the brake drum will cause the forks 23 and 24 to fulcrum about the pintles 26 in the external shoe, thereby urging the external shoe towards the brake drum contemporaneous the movement of the internal shoe towards said drum. Since one end of the external brake shoe 21 is fulcrumed on the pin 19 the actuation of the rod 41 will cause the forks to twist about the pintles mounted therein, which movement results in the brake shoes being moved circumferentially about and towards the brake drum 13 with an equal and uniform pressure.

In brake structures of the type in which the fluid actuating unit embodies a single piston rod for actuating the brake shoes, the actuating mechanisms frequently fail under the excessive torque reaction imposed thereon. The brake structure disclosed in the present invention is provided with a plurality of arms and levers interposed between the fluid actuating unit and the brake shoes which are adapted to mitigate the reactionary torque effect heretofore imposed on the unit. More particularly, the utilization of a connection composed of a plurality of cranks between the fluid actuating unit and the brake shoes relieves the unit from the deleterious effects resulting from the torque reaction of the brake shoes and drum.

In the modification shown in Figs. 4 through 6, the external and internal brake shoes 50 and 51, respectively, are pivotally mounted on pintles secured in the forks 53 and 54 in a manner similar to that described for the links shown in Fig. 1. However, the external brake shoe 50 is affixed to the arm 55 in a somewhat different manner. Secured to the arm 55 there is a block 56, Figs. 6 and 7, having a reduced end portion 57 which is adapted to be inserted in an opening 58 formed in the external brake shoe 50. Formed on opposed sides of the reduced end portion 57 there are ribs 59 adapted in conjunction with the rounded portions formed on the remaining sides to afford a slight pivotal or floating movement of the shoe relative to the block. Screw threaded in the brake shoe there is a pin which is adapted to engage a groove formed in the reduced end portion 57 for retaining the shoe thereon. The outward radial movement of the external brake shoe is limited by a rod 63 which has one end thereof pivotally mounted in a marginal edge of the shoe. The opposed end of the rod has nuts 64 threaded thereon for adjustably securing the same upon a lug 62 formed on the arm 55.

As shown in Fig. 4, the axle housing has secured thereto a suitable fluid actuating unit such as a cylinder 66 having a reciprocating piston therein with a piston rod 67 projecting therefrom. Pivotally mounted on the end of the piston rod there is a lever 68 having a split boss formed in the opposed end thereof which is clamped to a shaft 69. The shaft 69 is supported in brackets on the housing and has keyed upon an end portion thereof a crank arm 70 which is formed with a cylindrical socket for the reception of the rounded end portion of a link 71. The opposed end of the link is likewise rounded for engagement within a cylindrical socket on the end of the internal brake shoe 51.

The operation of the modified brake structure is the same as that described for the brake shown in Figs. 1 through 3, in that the movement of the piston rod 67 and lever 68 as indicated by the arrows (Fig. 4) will cause the oscillation of the shaft 69 and arm 70, the actuation of the link 71 and forks 53 and 54 and consequent actuation of the internal and external shoes. By virtue of the adjustability of the supporting rod 63 and the floating movement afforded through the block 56 the external brake shoe may be driven into full concentric engagement with the drum during the operation thereof without undue wear upon any localized portion thereof.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

I claim:

1. A brake mechanism comprising, a brake drum, an internal and external brake shoe engageable therewith, a fixed arm having one end of the external brake shoe mounted thereon, pendulant links intermediate said inner and outer shoes and affixed thereto, a cylinder having a fluid actuated piston therein, a stop on said arm to delimit the inward movement of one end of said internal brake shoe, an abutment on the opposite end of the internal brake shoe, a rod pivotally connected thereto, a lever affixed to said piston and disposed in parallel relation to said rod, and an arm connected to said lever and rod for actuating said rod to effect the oscillation of said links.

2. A brake mechanism comprising, a brake drum, an internal and external brake shoe engageable therewith, a fixed arm having one end of the external brake shoe mounted thereon, a pair of forks uniting the brake shoes, a cylinder having a fluid actuated piston therein, a piston rod extending from said cylinder, a lever pivotally mounted thereon, a shaft having said lever keyed thereto, an arm affixed on said shaft, a rod interposed between said arm and one of the brake shoes for oscillating the forks and means secured to one of said shoes to delimit the radial movement thereof.

RALPH H. ROSENBERG.